E. PITCHER.
TRACTOR.
APPLICATION FILED APR. 9, 1918.
1,322,049.
Patented Nov. 18, 1919.
2 SHEETS—SHEET 1.
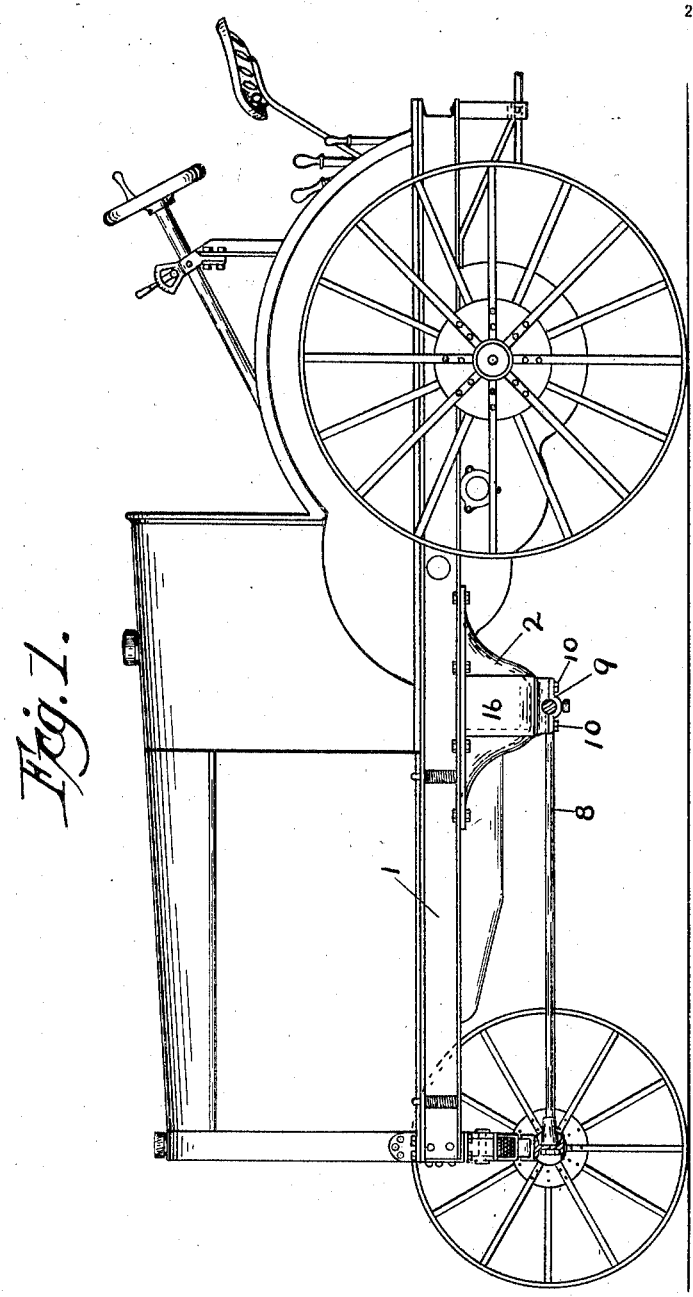
Inventor
Elmer Pitcher
by C. D. Enochs
Attorney

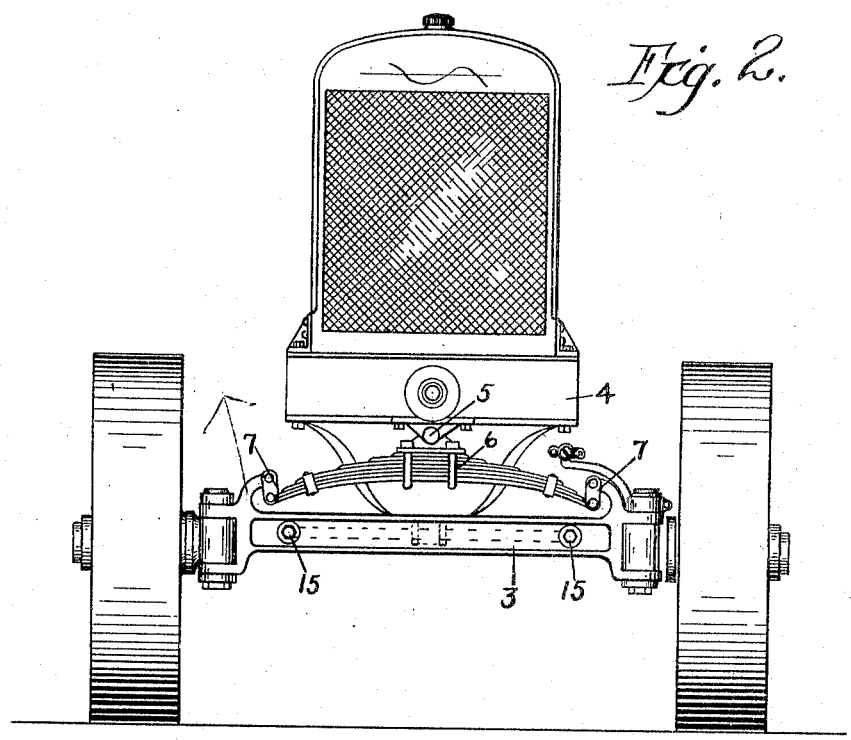
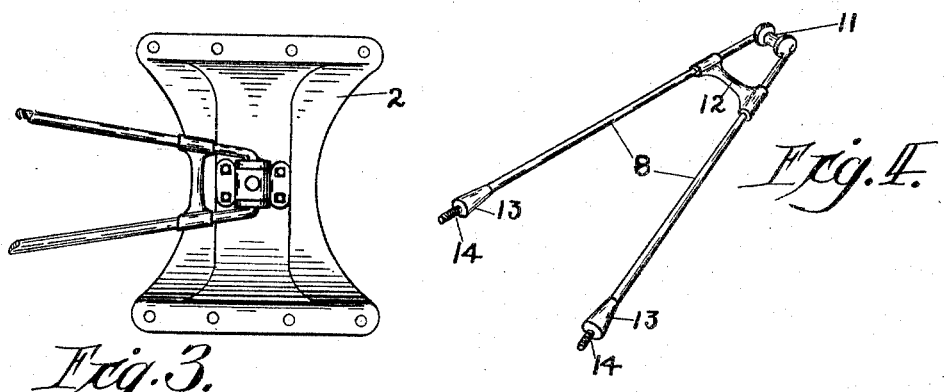

UNITED STATES PATENT OFFICE.

ELMER PITCHER, OF MINNEAPOLIS, MINNESOTA, ASSIGNOR TO LIBERTY TRACTOR COMPANY, OF MINNEAPOLIS, MINNESOTA, A CORPORATION OF MINNESOTA.

TRACTOR.

1,322,049.  Specification of Letters Patent.  Patented Nov. 18, 1919.

Application filed April 9, 1918. Serial No. 227,611.

*To all whom it may concern:*

Be it known that I, ELMER PITCHER, a citizen of the United States, residing at Minneapolis, in the county of Hennepin and State of Minnesota, have invented certain new and useful Improvements in Tractors, of which the following is a specification.

One object of my invention is to provide in a tractor an improved spring mounting for the front of the frame of the machine.

Another object of my invention is to provide in connection with a spring mounted front end of a tractor, an improved radius rod construction.

Another object of my invention is to provide an improved support for the rear end of the radius rod, which also stiffens the frame of the tractor.

With these and incidental objects in view the invention consists of certain novel features of construction and combination of parts, the essential elements of which are hereinafter described with reference to the drawings which accompany and form a part of this specification.

In the drawings Figure 1 is a side elevation of a tractor, embodying my invention with the one front wheel removed and the radius rod shown in section on the line 1—1, Fig. 4.

Fig. 2 is an end view of the tractor shown in Fig. 1.

Fig. 3 is a bottom view of the radius rod support and Fig. 4 is an isometric view of the radius rods.

The tractor which is of an ordinary construction has a frame preferably built of channels, suitably joined and carrying, bolted thereto, a radius rod support Figs. 1 and 3.

The front axle 3, Fig. 2, has mounted thereon, the front end 4 of the frame of the tractor, the connection being made through a king-bolt 5, spring 6 and spring shackles 7.

The support 2, Figs. 1 and 3 has carried thereby, the radius rods 8, held to the support 2 by the cap 9, suitably attached by bolts 10.

The cross member 11 of the radius rod, is thus journaled in the support 2 to allow the functioning of the spring 6.

The radius rods 8 are braced by the member 12 and are provided with shoulders 13, having studs 14 extending therefrom, which pass through the axle 3, Fig. 2 and are clamped thereto by suitable nuts and washers 15.

It is evident that this construction stiffens the front axle as against any back motion and at the same time allows a free action of the spring 6, but as the radius rods 8 are horizontal the swing of these rods about the cross member 11, does not draw the front axle noticeably out of line with the vertical, and hence, the steering is accomplished in the ordinary manner without any of the difficulty that would be experienced if the position of the radius rods were such as to allow the front axle to get much out of the vertical line.

Moreover, it will be seen from Figs. 1 and 3 that the support 2 stiffens the frame of the machine at its central portion, and also provides a housing 16 to inclose the fly-wheel of the engine used to provide power for the tractor.

While I have described my invention and illustrated it in one particular design, I do not wish it understood that I limit myself to this construction, as it is evident that the application of my invention may be varied in many ways within the scope of the following claim:

Claim:

In a tractor, the combination of a frame, a front axle, a spring supporting said frame on said axle, a downwardly extending support on said frame, spaced from said axle, and a radius rod extending backwardly from said axle to which it is rigidly fastened and journaled in said support for movement in a vertical plane only.

ELMER PITCHER.